United States Patent Office 3,432,055
Patented Mar. 11, 1969

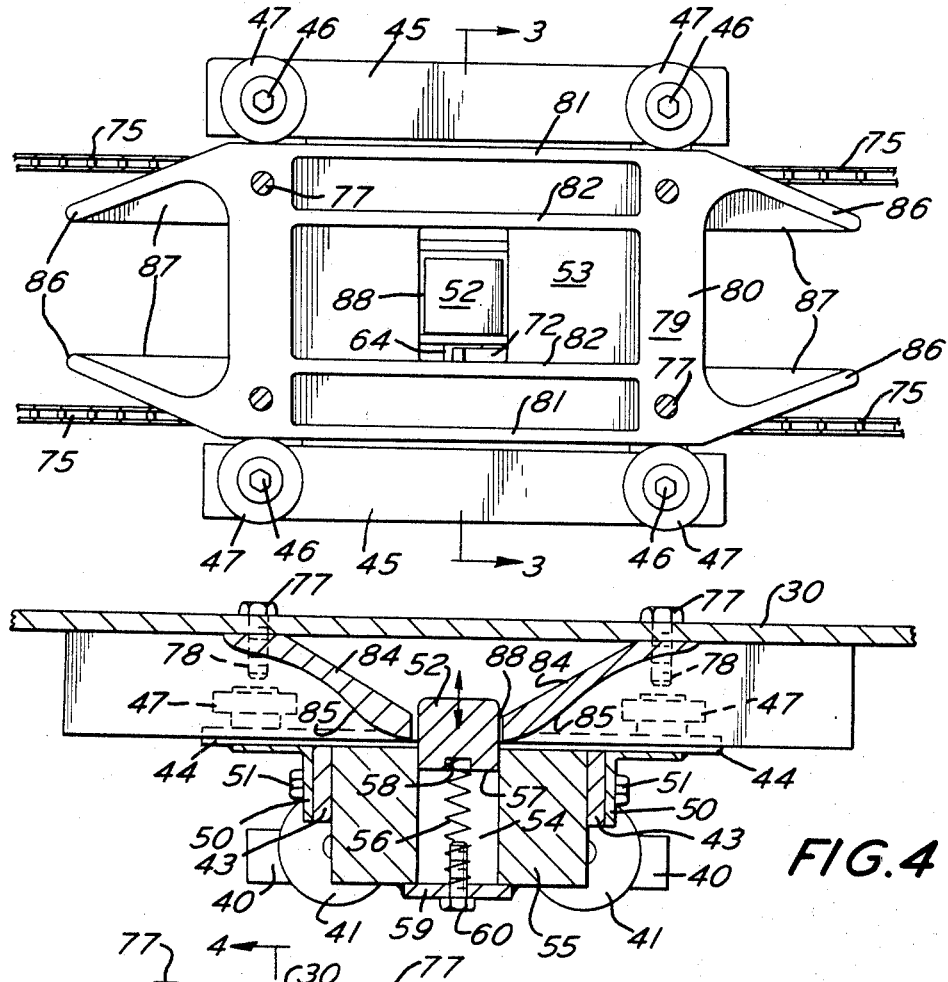
FIG.2
FIG.4
FIG.3
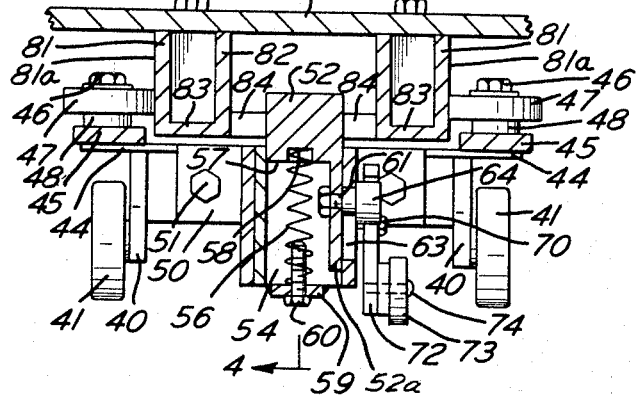
INVENTOR.
NICHOLAS R. GUILBERT, JR.
BY
ATTORNEY

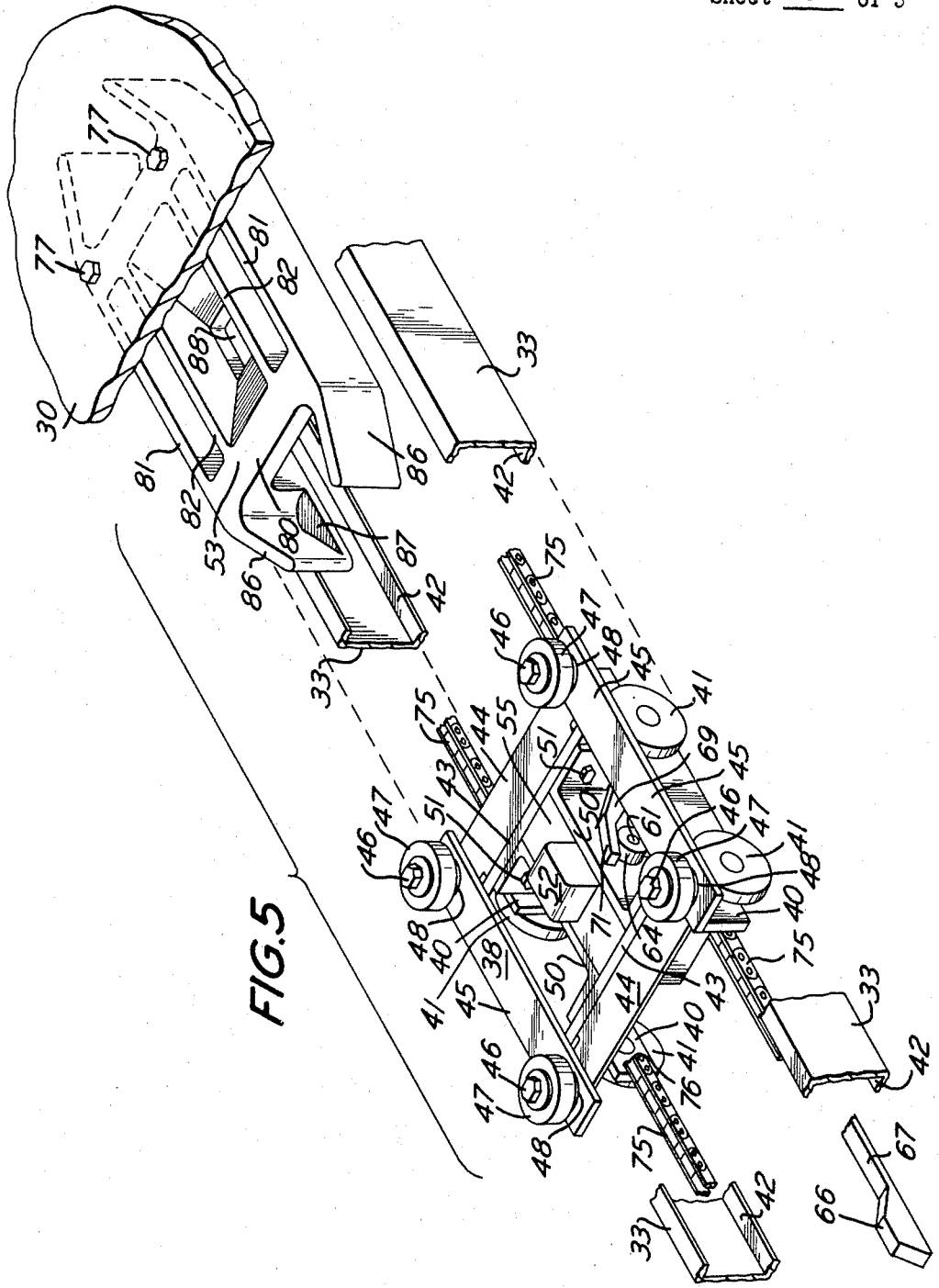

3,432,055
COUPLING FOR CARTS
Nicholas R. Guilbert, Jr., Glenside, Pa., assignor to Guilbert, Incorporated, Philadelphia, Pa., a corporation of Pennsylvania
Filed Feb. 15, 1967, Ser. No. 616,240
U.S. Cl. 214—730
Int. Cl. B66f 9/14; E04h 6/06
8 Claims

ABSTRACT OF THE DISCLOSURE

This invention relates to a coupling for carts and more particularly to a coupling with provisions for guiding the movement of a cart to a position for coupling.

BACKGROUND OF THE INVENTION

Field of the invention

This invention is in the field of devices for engaging and guiding a vehicle which is adapted to move along a horizontal path.

Description of the prior art

In the use of carts, such as dumbwaiter carts, to move articles from one location to another problems of control of cart movement have arisen. Most of the dumbwaiter carts in use today have at least one if not two pairs of swivel wheels thereon, the pairs of wheels being located at the front and rear of the cart respectively.

With manual movement of the cart it is possible to completely direct and guide the motion of the cart along constricted locations, such as narow halls and doorways. With automatic loading and unloading apparatus in use, such as shown in my prior U.S. application Ser. No. 391,656, filed Nov. 24, 1964, it is highly desirable that the carts move in a straight line and avoid any tendency to follow a crooked path of motion and become jammed sideways in doorways and halls. Should this jamming occur, manual interposition is required to move the cart, causing extra expense and obviating the advantages of the automatic equipment.

This invention provides a simple and novel means of controlling the horizontal motion of the cart suitable for use with automatic loading and unloading equipment and can also be used with manual means.

SUMMARY OF THE INVENTION

The principal object of the present invention is to provide a coupler fitting for carts that effectively guides the motion of the cart without requiring manual attention.

A further object of the present invention is to provide a coupler fitting for carts that is capable of being used with a variety of sizes and types of carts and cart handling equipment.

A further object of the present invention is to provide a coupler fitting for carts that is simple and inexpensive to construct but durable and long wearing in operation.

A further object of the present invention is to provide a coupler fitting for carts that is safe and positive in operation and requires little maintenance.

Other objects and advantageous features of the invention will be apparent from the description and claims.

BRIEF DESCRIPTION OF THE DRAWING

The nature and characteristic features of the invention will be more readily understood from the following description, taken in connection with the accompanying drawings forming part thereof, in which:

FIG. 2 is a horizontal sectional view, enlarged, taken approximately on the line 2—2 of FIG. 1, and showing the coupler fitting in accordance with the present invention;

FIG. 3 is a vertical sectional view taken approximately on the line 3—3 of FIG. 2;

FIG. 4 is a vertical sectional view taken approximately on the line 4—4 of FIG. 3; and FIG. 5 is a partial exploded view in perspective showing the coupler fitting of the present invention and associated elements.

DESCRIPTION OF THE PREFERRED EMBODIMENT

Figure 1:
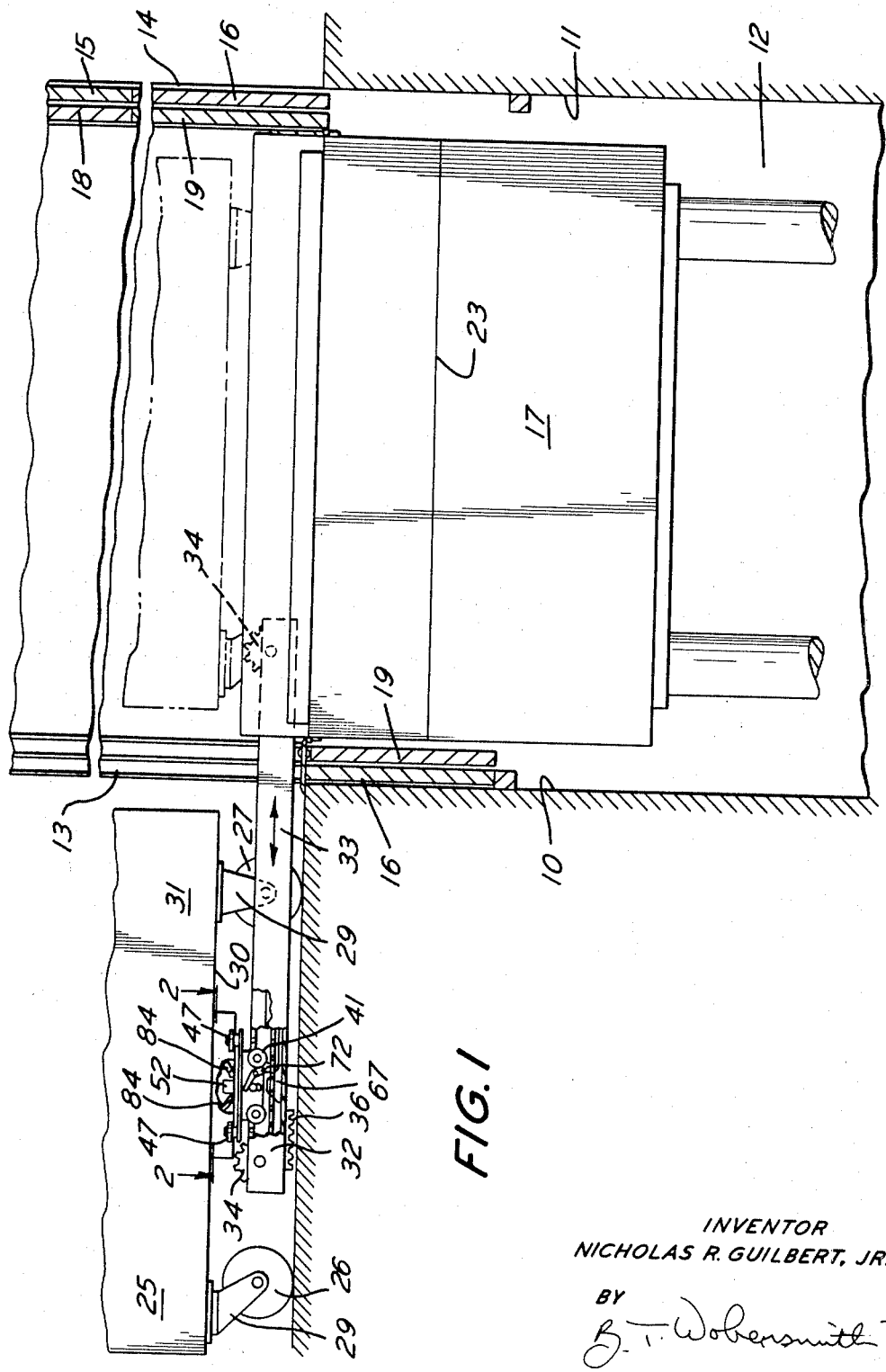
FIGURE 1 is a vertical sectional view through a dumbwaiter hatchway showing a dumbwaiter cart incorporating the present invention and in the condition of institution of loading or completion of unloading.

It should, of course be understood that the description and drawings herein are illustrative merely, and that various modifications and changes can be made in the structure disclosed without departing from the spirit of the invention.

Like numerals refer to like parts throughout the several views.

Referring now more particularly to the drawings and specifically FIG. 1 thereof, opposite parallel vertical walls 10 and 11, and one of the opposite vertical side walls 12 of a hatchway are shown, with access openings 13 and 14 through the walls 10 and 11, respectively. The openings 13 and 14 are normally closed by upper and lower hatchway doors 15 and 16. The doors 15 and 16 can be of any desired type but are preferably movable vertically and respectively upwardly and downwardly for access through the selected access openings 13 and 14.

A car 17 of well known type guided and movable along vertical rails (not shown) in the hatchway is provided and is moved vertically in the hatchway to the desired levels by operating mechanism (not shown), also of well known type.

The car 17 at each end preferably has upper and lower doors 18 and 19 of any preferred type but movable vertically and respectively upwardly and downwardly for access in the desired direction through the selected openings 13 and 14.

The access openings 13 and 14 are typical of those provided at each level at which loading or unloading is to be effected.

The car 17 has a horizontal bottom floor 23 on which a supporting frame (not shown) is mounted.

One form of car loading and unloading apparatus with which the present invention is particularly useful is more fully described in my prior application, Ser. No. 391,656, filed Nov. 24, 1964, but the coupling of the present invention is not limited to use with that apparatus and can be used with car carriers other than dumbwaiter cars.

A dumbwaiter cart 25 is provided, of well known type, the cart 25 having a front pair of swivel wheels 26 and rear pair of swivel wheels 27 rotatably mounted on flanges 29 carried on the underside of floor 30 of cart 25. The flanges 29 are mounted on floor 30 so that they can swivel about a vertical axis and assume varying positions as required. The cart 25 has vertical sides 31 and other features common to dumbwaiter carts.

A carriage 32 is provided, carried by the car 17, for horizontal movement for loading and unloading of the cart 25 from the car 17. The carriage 32 has horizontally extending side bars 33, carried in trackways (not shown) on the car 17 and provided with gears 34 and rack gear teeth 36 for engagement with mechanism (not shown) in car 17 to urge the horizontal movement, of the carriage 32.

Referring more specifically to FIGS. 2 and 5 of the drawings the carriage 32 has a cart engagement assembly 38 thereon. The assembly 38 is of essentially rectangular shape and provided with four vertical side plates 40 with rollers 41 rotatably mounted thereon, the rollers 41 are engaged by horizontally inwardly extending rails 42 of side bars 33 and free to move therealong.

The plates 40 have the front pair and the rear pair respectively connected by vertical flat bars 43 which are integral with top horizontal frame plates 44. The bars 43 and frame plates 44 extend sidewise across the assembly 38 at the front and rear thereof to connect each roller 41 of the front and rear pairs of rollers 41 into pairs. Two additional frame plates 45 are provided extending lengthwise along the assembly 38 connected to the plates 44 by four threaded bolts 46.

Four horizontal rollers 47 are provided at the four corners of the assembly 38, the rollers 47 are engaged by the bolts 46 and have spacer discs 48 under them on plates 45, the rollers 47 are free to rotate around the vertical axis of the bolts 46.

Two U-shaped vertical bars 50 are provided extending lengthwise and connected to the vertical bars 43 by threaded bolts 51.

Intermediate the bars 50, a square latch bar 52 is provided, for engagement with a coupler fitting 53 on the floor 30 of the cart 25. The latch bar 52 is mounted in a vertical slot 54 formed in a U-shaped block 55. The block 55 is between the bars 50 and is welded or otherwise secured to the bars 50, extends vertically to the bottom of bars 50 and is the same length. The latch bar 52 is urged upwardly by a spring 56 which bears on the underside 57 of latch bar 52 and is engaged in a socket 58 in latch bar 52. The spring 56 bears on a horizontal bottom closure plate 59 which is welded to the underside of block 55. A bolt 60 is threadably engaged in the plate 59 and carries the spring 56 thereon.

The latch bar 52 is provided with a vertical downwardly extending integral portion 52a of substantially rectangular shape, which is provided with a horizontal threaded bolt 61. The bolt 61 extends outwardly through a vertical slot 63 in the bar 50 and is provided with a collar 64 at its outer end.

A latch dog 69 is provided secured to bar 50 by pin 70 and with an upper curved cam arm 71 bearing on collar 64 of bolt 61, and rectangular lower portion 72. The portion 72 is provided with a roller 73 pinned to it by a pin 74 and the roller 73 is engaged by a cam 66 on a rail 67 of the carriage assembly 38 for rotational movement about the pin 70, the upper cam arm acting to move the bolt 61 vertically in the slot 63 to depress the latch bar 52.

The carriage assembly 38 is urged along the rails 42 by two chains 75 on each side respectively attached to the front and rear of the carriage assembly 38 by pins 76 or other suitable attaching devices.

The coupler fitting 53 is attached to the floor 30 of the cart 25, by four bolts 77 threadably engaged in holes 78 in a top frame 79 of the fitting 53. The top frame 79 is of substantially rectangular shape and provided with two flat horizontal sidewise extending bars 80 connected by two vertical downwardly extending outer plates 81 and two inner plates 82. The respective plates 81 and 82 on each side of fitting 53 are connected at their bottom by a lengthwise horizontal closure plate 83.

The plates 81 are of substantially rectangular shape and have their outer surfaces 81a engaged with the rollers 47 of the assembly 38, preventing sidewise movement of the fitting 53 when in engaged position.

Two latch bar engagement plates 84 are provided at the bottom of inner plates 82, connecting the inner plates 82 together and extending upwardly and connected to bars 80 of top frame 79. The plates 84 are of curved shape in cross section as shown more fully in FIG. 4 and provided with an outer surface 85 for engagement with the latch bar 52, the curvature being such as to depress bar 52 as one of the plates 84 advances over the top of the bar 52. A hole 88 is formed between the plates 84 and extends the whole sidewise distance between inner plates 82 and is suitable to receive latch bar 52 in engaged position.

The coupler 53 at the front and rear thereof has two vertical and inwardly tapered wall portions 86 attached thereto and integral with the frame 79, the wall portions 86 have yoke plates 87 on the bottom thereof. The yoke plates 87 are extensions of the closure plates 83 and serve to reinforce the cam wall portions 86.

The mode of operation will now be pointed out.

Assume the care 25 is at a position outside the dumbwaiter hatchway waiting to be moved onto the car 17.

The mechanism (not shown) for advancement of the carriage assembly 38 carried by car 17 is activated and bars 33 are advanced beneath the cart 25. The gear mechanism (not shown) on the car 17 is activated to propel the carriage assembly 38 along the rails 42 by movement of the chains 75. When the carriage assembly 38 moves under the fitting 53 on the cart 25, the tapered wall portions 86 will enter between the rollers 47 and tend to orient the fitting 53 to the extent necesary thereby moving the cart 25 to orient it for straight movement into the car 17. The curved surface 85 of plate 84 will contact the latch bar 52 and force it down into slot 54 against the spring 56. Forward movement of the assembly will continue to force down the bar 52 until it is free to enter hole 88 in fitting 53 at which point the coupler fitting 53 and carriage assembly 38 are fully engaged. The carriage assembly 38 can then be withdrawn onto car 17 as desired. Should it be necessary to uncouple the carriage 38 from the fitting 53 cam bar 67 may be extended out to engage roller 73 on arm 69 thereby moving arm 69 against collar 64 and through bolt 61 moving latch bar 52 down into slot 54 and out of engagement position with hole 88 in fitting 53.

Movements in reverse of that described can be accomplished in the same manner.

I claim:

1. A coupling mechanism for loading and unloading carts with respect to a car with a carrier carried on the car comprising
    a cart,
    a car carried carrier,
    a carrier mounted carriage horizontally movable with respect to the car carried carrier,
    said carriage having a frame with side guiding members provided with vertically disposed guiding surfaces,
    said frame having a retractable latching member carried thereby and normally urged in a predetermined direction, and
    a coupling member on the cart movable with the cart in opposite directions and engageable from either selected end of the cart by said side guiding members in either direction of movement of the side guiding members for orienting the cart and constraining the cart to move parallel with the car carried carrier and having portions engaged by said latching member in latched position.

2. A coupling mechanism as defined in claim 1 in which
    said side guiding members are rollers and
    said coupling member has vertical side walls engaging said rollers.

3. A coupling mechanism as defined in claim 2 in which
    said vertical side walls have tapered frontal sections.

4. A coupling mechanism as defined in claim 1 in which
    said carriage has a lever carried thereby and connected to said latching member for retracting said latching member.

5. A coupling mechanism as defined in claim 4 in which
    said latching member has a resilient member engaged therewith and normally urging it in one direction.

6. A coupling mechanism as defined in claim 1 in which
said coupling member has a cam portion for urging said latching member to a position for latching engagement.

7. A coupling mechanism as defined in claim 1 in which
retractable rails are provided carried by the car, and
said carriage has guide rollers mounted on said frame and engaging said rails.

8. A coupling mechanism as defined in claim 1 in which
said side guiding members are rollers on vertical axes,
said coupling member has vertical side walls engaging said rollers,
said vertical side walls have tapered frontal sections for engaging said side guiding members,
said carriage has a lever carried thereby connected to said latching member for retracting said latching member,
said latching member has a resilient member engaged therewith and normally urging it in a direction for latching engagement,
said coupling member has a cam portion for urging said latching member against the force of said resilient member.

References Cited

UNITED STATES PATENTS

| | | | |
|---|---|---|---|
| 1,084,820 | 1/1914 | Pescatore | 280—434 |
| 1,410,935 | 3/1922 | Lazareth | 214—38 |
| 1,828,307 | 10/1931 | Been | 214—16.1 |
| 2,031,256 | 2/1936 | Dorsey | 280—434 |
| 2,545,696 | 3/1951 | Harvoot | 214—38 |
| 2,721,521 | 10/1955 | Mitchell | 104—48 |
| 2,786,590 | 3/1957 | Edwards et al. | 214—38 X |
| 2,925,286 | 2/1960 | Hodges et al. | 280—434 |

GERALD M. FORLENZA, *Primary Examiner.*

FRANK E. WERNER, *Assistant Examiner.*

U.S. Cl. X.R.

214—16.1